Figure 1:
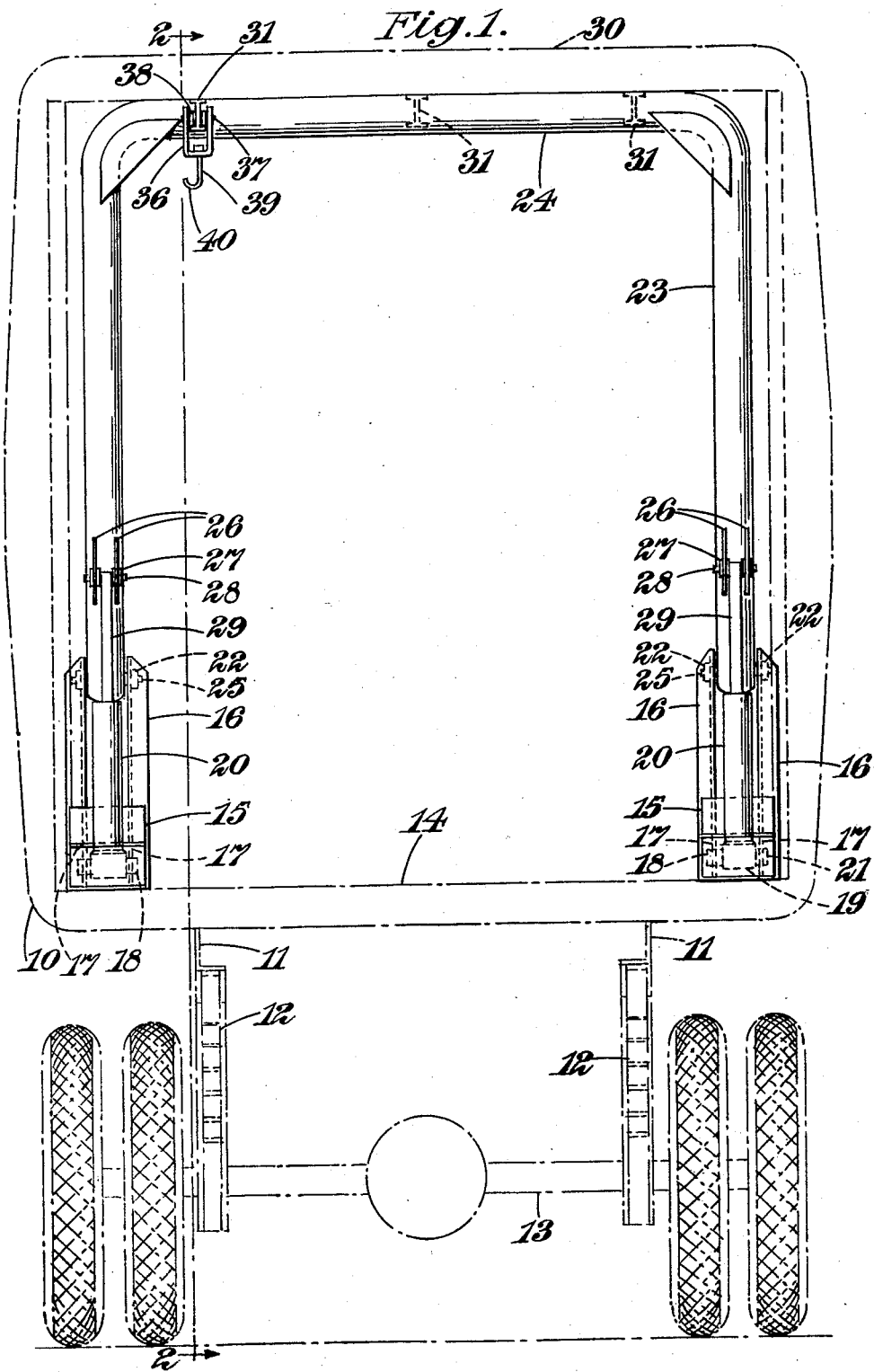

Aug. 14, 1956  R. P. J. TAPP ET AL  2,758,730
LOADING AND UNLOADING APPARATUS CARRIED BY VEHICLES
Filed Jan. 20, 1955  3 Sheets-Sheet 2

INVENTORS
R. P. J. TAPP,
E. R. AVENELL &
D. G. HANSEN
BY Young, Emery & Thompson
ATTYS.

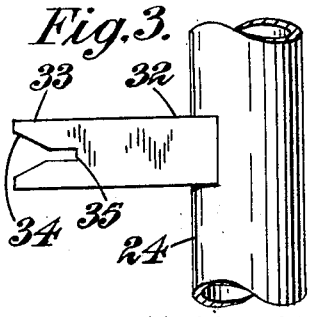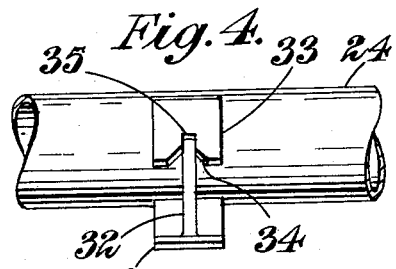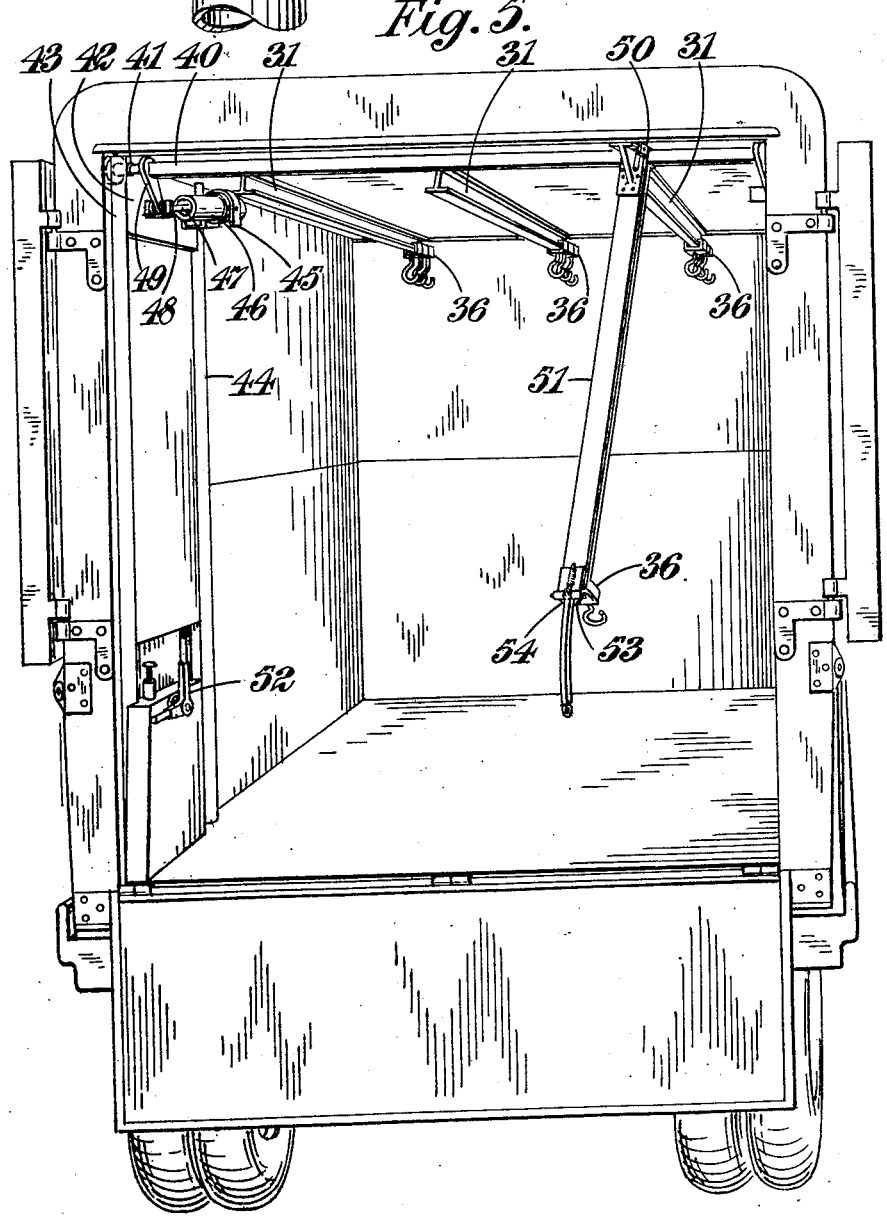

United States Patent Office 2,758,730
Patented Aug. 14, 1956

2,758,730

LOADING AND UNLOADING APPARATUS CARRIED BY VEHICLES

Raymond Percy James Tapp, Eric Robert Avenell, and Dennis Gordon Hansen, London, England, assignors to Market Transport Limited, London, England, a British company Application January 20, 1955, Serial No. 482,974

Claims priority, application Great Britain January 20, 1954

6 Claims. (Cl. 214—77)

This invention relates to loading and unloading apparatus carried by a vehicle and particularly, but not exclusively for unloading goods suspended from overhead supports, which may be used in meat vans.

According to this invention a loading and unloading apparatus carried by a vehicle comprises a beam or the like arranged to extend across the width of the vehicle, one or more members on said beam adapted to receive an article or articles to be loaded or unloaded and means for imparting movement to said beam whereby the article or articles supported by the beam may be lowered from an inboard position to lower outboard position.

There may be secured to the roof of the vehicle a rail extending in a fore and aft direction and one or more carriages are arranged onto said rail for supporting said articles, which member on the beam is arranged to be brought into register with the rail and which member and rail are so shaped and arranged that a carriage may pass from said rail to said member or vice versa.

Preferably a number of rails are secured to the roof of the vehicle so as to extend in a fore and aft direction, and so as to be disposed apart across the width of the vehicle, and either a single member is adjustable along said beam so it may be brought opposite any of said rails, or there are a number of members fixed on said beam and spaced apart in a corresponding manner to the spacing of said rails and one or more carriages is or are adapted to pass from the rail onto said member on the beam.

In one construction according to the invention the aforesaid beam is attached to one or more arms mounted to swing about a transverse horizontal axis and means are provided for imparting swinging movement to said arms.

The arm or arms carrying said beam may be arranged to swing about a transverse axis disposed close to the roof or floor of the vehicle.

In the case where a number of members are fixed to said beam and spaced apart in a corresponding manner to the spacing of the rails, interengaging means may be provided on said members and rails for aligning them when the members are in their uppermost position.

In an alternative construction, the aforesaid member for supporting an article on the beam may comprise a jib arm extending away from the beam and so mounted on the beams as to be fixed against relative rotation about the longitudinal axis of the beam, but capable of longitudinal movement along said axis, and means are provided for moving the beam along the longitudinal axis, whereby the extremity of said jib arm is arranged to be raised or lowered.

In any of the arrangements referred to above the means for imparting movement to said beam may comprise a hydraulic, mechanical or electrical transmission. For example the transmission may comprise a hydraulic jack, energised by a pump driven from the vehicle engine.

In the case where the member is adjustable along the beam, it may be effected by mechanical transmission.

Figure 2:
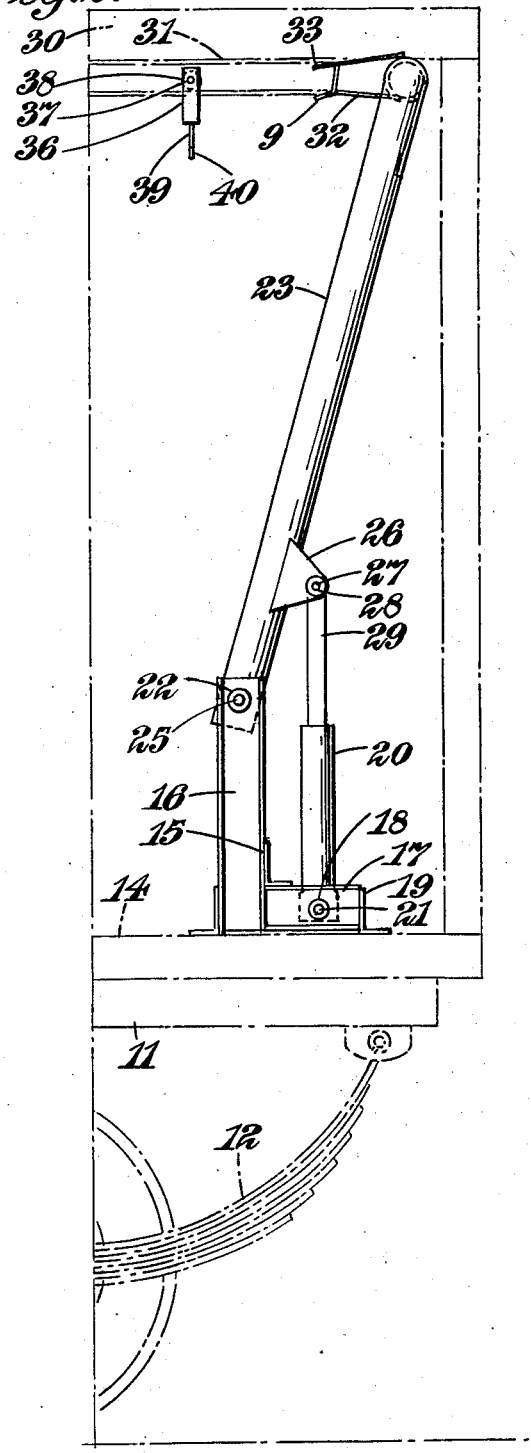

The following is a description of two alternative forms of unloading or loading gear suitable for meat vans reference being made to the accompanying drawings in which:

Figure 1 is a rear elevation of the van showing the lifting gear in its uppermost position, Figure 2 is a side elevation of the ends of the van with a side removed so as to show the lifting gear, Figure 3 is a plan view of one of the members fixed to the beam showing the means for locating it in relation to a rail, Figure 4 is an elevation of the locating means looking from the left of Figure 2, and Figure 5 is a diagrammatic perspective view of an alternative form of lifting and lowering gear.

Referring to Figures 1 to 4 the body 10 of the vehicle is supported in conventional manner on longitudinal members 11 of the chassis frame so as to project on either side thereof, and which chassis frame is supported by springs 12 from the wheel axle 13 of the vehicle. Mounted on the floor 14 of the body of these parts which project beyond the chassis frame 11 are two bracket structures 15. Each bracket structure comprises two upright channel members 16 spaced apart and having their web portions nearest one another. Each bracket structure also comprises two rearwardly extending feet 17 formed from channel section steel spaced apart and secured to the upright members 16 by welding and by cross members 18 and 19 which are formed from angle section and welded in position. Extending through the web portions of the channel section members 17 are bushes 18 which project on either side thereof. Disposed between the two channel section members 17 is the lower extremity of a cylinder 20 of a hydraulic ram, which lower end is provided with a bearing and a pivot pin 21 extends through the bushes 18 and said bearing. Similarly bushes 22 extend through holes in the web portions of the upright channel members 16 and are welded in position. Disposed between the upright members 16 of each bracket is the lower end of a limb 23 of a U shaped structure formed from stout steel tubing. The cross member 24 of the U shaped structure constituting the aforesaid beam. Extending through and secured to the lower extremity of each limb 23 is a bush (not shown) and extending through this bush and the bushes 22 is a pivot pin 25. Welded to each limb 23 adjacent to its lower end are two triangular plates 26, which plates are provided with bushes 27, through which extends a pivot pin 28 carried by the upper end of the plunger 29 of the hydraulic ram. Thus by energising and de-energising the hydraulic ram, the U shaped structure may be swung in an up and down direction. Secured to the roof 30 of the vehicle are three rails 31 extending in a fore and aft direction and spaced apart across the width of the body, which rails may either be of I section as shown or inverted T section. As will be seen from Figure 2 the limbs 23 of the U shaped structure when in the uppermost position, are inclined to the vertical at an angle of about 15°. Secured to the cross member or beam 24 are three members 32 of I section so as to be spaced apart in a corresponding manner to the spacing apart of the rails 31. The upper flange of each member 32 extends at 33 beyond the web portion whereas the lower flange is of the same length as the web portion, but has welded beneath it, an extension 34 which when the beam is in its upper position engages with the underside of the lower flange of a rail 31 the portion 34 is inclined downwardly from the lower flange of the member 32. As will be seen from Figure 3, the extended portion of the upper flange is cut away to provide a V-shaped mouth 34 leading to a slot 35 which is of such a width as to accommodate the web portions at the end of one of the rails 31. With this arrangement as the U-shaped structure is swung upwardly, the V-shaped mouths 34 guide the web portions of the rail 31 into the slots 35 and the lower flanges of the rails ride up the inclined extensions 34 thus although the body of the vehicle may become slightly warped or distorted, the I section rails are brought into accurate register with the I shaped section members 32. In order to prevent the warping of the body from affecting the registration of the members 32 and the rails 31 the end of the rails may be securely fixed to a member of a rigid frame (not shown) which may embody the aforesaid bracket structures 15. For example each bracket is provided with an upward extension which lies on the outside of one of the limbs 23 of the U shaped structure and which extensions are connected at their upper ends by a cross member fixed to the rails.

Supported on each rail are a number of carriages, only one of which is shown, and each comprising a U shaped member 36, the limbs of which straddle the lower flange of the rail 31 and are each provided with a spindle 37 on which are mounted rollers 38 which engage the aforesaid lower flange. Pivotally mounted and extending downwardly from the bottom of the U shaped members 36 is a shank 39 formed with a hook 40. The hook is arranged to engage the article to be supported, for example, to engage the sinews of a carcass of meat.

When the vehicle is to be unloaded, the U shaped structure 23, 24 is raised by the hydraulic ram until the I section members 32 on the cross beam are brought into register with the rails 31. The carriages 36 are then engaged in turn by a pole having a hook at the end and drawn along the rails until they pass on to the I section members 32. When all three carriages are in position the hydraulic rams are operated to lower the U shaped structure into a position which will enable a porter to unhook the articles such as a carcass of meat and carry them away. Should the vehicle be on a slope when the rear part of the vehicle is lowermost there may be a tendency when the inverted U shaped structure 23, 24 is lowered for the remaining carriages 36 to run down the sloping rails 31, and in order to prevent them from falling off the ends, detent means may be associated with the end of each rail, which when the U shaped structure is lowered, the detents are released swinging an abutment into the path of movement of the carriage.

It will be appreciated that in place of providing the cross member 24 with three separate I section members 32, a single I section 32 might be arranged to be adjustable along the front member 24 so as to bring it opposite any one of the rails.

Referring now to the arrangement shown in Figure 5, the aforesaid beam is in the form of a cross shaft extending across and at a slightly higher level than the ends of the rails 31. The cross shaft is provided with journal portions at its end which engage bearing 41 mounted on a base plate 42 or the like secured between two upright frame members 43 and 44 of the body. Also mounted on the base plate 42 is a bracket 45 in which is pivotally mounted, one end of a cylinder 46 of a hydraulic ram. The plunger 47 of the hydraulic ram is pivotally connected at 48 to the end of a lever arm 49 fixed to the cross shaft. The cross shaft between the bearings and lever arm is non-circular in cross section, for example, it can be of square section or may be provided with splines, and slidably mounted on this portion of the cross shaft is a block 50 having a bore of similar configuration to that of the cross section of the shaft which block has fixed beneath it a jib arm 51 of I section. Thus by operation of the hydraulic rams the jib arm may be swung in an up and down direction. The jib arm is so mounted on the block 50 that when it is in its upper position its I section may be brought into register with the I section of any of the three rails. The hydraulic ram is controlled by valve gear 52 which is easily accessible from the rear end of the body. The block 50 may be traversed along the cross shaft 40 by means of a pulley and cable transmission (not shown). For example, on one of the base plates 42 there may be disposed a single pulley rotatable about a vertical axis, and on the other base plate there may be mounted two pulleys each mounted on a horizontal fore and aft axis. An endless cable encircles the first said pulley and its two stretches pass over the other two pulleys downwardly and around a single pulley mounted to rotate about a transverse horizontal axis, which latter pulley is provided with a widening handle. One of the stretches between the first said single pulley and the pair of pulleys is attached to said block.

As in the previous construction, each of the rails may be provided with a number of carriages 36 which when the end of the jib arm is in register with the end of the rail, can pass from the rail onto the jib arm, to the outer end thereof. It is normally prevented from passing off the end of the jib arm by means of an abutment 53 mounted at one end of a lever arm pivoted at 54 on the jib arm, but which can be moved out of the path of travel by movement of the other end 54 of the lever arm.

We claim:

1. A vehicle having loading and unloading means comprising a number of rails secured to the roof thereof so as to extend in a fore and aft direction and so as to be spaced apart, a number of carriages movable along said rails and each adapted to support an article for transit, a U-shaped member having the extremities of its limbs pivotally connected to the vehicle so that the cross member of the U may be swung from a position in which it extends across the rails to an outboard position and vice versa, and a number of rail extensions fixed to said cross member and arranged to abut against the ends of said rails and means for imparting up and down swinging movement to said U-shaped member.

2. A vehicle according to claim 1 wherein said rails and rail extensions are provided with interengaging parts which locate them both in a lateral direction and up and down direction.

3. A vehicle according to claim 1 wherein the rails and rail extensions each comprise a lower flange portion and an upstanding web portion and wherein means for maintaining the ends of the rails and rail extensions in register comprise a projection on the flange of each extension which underlies the flange of a rail and a fork piece also on the rail extension which straddles the web of the rail.

4. A vehicle according to claim 1 wherein said arms of the U-shaped member are pivoted to a rigid support attached to the vehicle and wherein the means for imparting swinging movement to the U-shaped members are also mounted on said support.

5. A vehicle according to claim 1 wherein there is secured to the floor of the vehicle on each side thereof a bracket having an upstanding part to the upper end of which one of the arms of the U-shaped member is secured by a pivotal connection and a foot portion to which is pivotally secured the cylinder of a hydraulic ram, the piston rod of which is pivotally secured to said arm at a locality away from said pivoted connection.

6. A vehicle according to claim 1 wherein said U- shaped member comprises an integral tubular element bent to provide two parallel limbs and a straight cross member.

References Cited in the file of this patent

UNITED STATES PATENTS

| | | |
|---|---|---|
| 809,618 | Keech | Jan. 9, 1906 |
| 2,159,623 | Schmidt | May 23, 1939 |
| 2,442,549 | Pearlman | June 1, 1948 |
| 2,513,355 | Peckinpaugh | July 4, 1950 |

FOREIGN PATENTS

| | | |
|---|---|---|
| 726,413 | France | Mar. 1, 1932 |